Oct. 28, 1952     C. E. PECK ET AL     2,615,795
CATALYTIC GAS GENERATOR

Filed July 23, 1949     3 Sheets—Sheet 3

WITNESSES:
Robert A Baird
Wm. C. Groome

INVENTORS
Clarence E. Peck &
John G. Hoop.
BY
B. L. Zauguell
ATTORNEY

Patented Oct. 28, 1952

2,615,795

UNITED STATES PATENT OFFICE 2,615,795

CATALYTIC GAS GENERATOR

Clarence E. Peck, Cambridge Springs, and John G. Hoop, Meadville, Pa., assignors to Westinghouse Electric Corporation, East Pittsburgh, Pa., a corporation of Pennsylvania Application July 23, 1949, Serial No. 106,406

2 Claims. (Cl. 23—281)

This invention relates generally to improved gas generator equipment of a type in which a combustible hydrocarbon, or fuel gas, is reacted with oxygen-containing gas, or air, for producing a controlled or protective special atmosphere, or product-gas, suitable for enveloping a metallic charge which is undergoing a heat-treatment; but such a product-gas may have other uses.

The fuel gas may be artificial city gas, natural gas, propane, or any other fuel gas, and is reacted with air in various proportions depending on the composition desired for the product-gas. With natural gas, a ratio of as little as about 2.3:1 by volume of air to fuel gas will provide a product-gas useful for bright-hardening high-carbon steels, for brazing ferrous metals, and for other purposes. On the other extreme, ratios of about 10:1 of these gases by volume provide a product-gas useful for bright annealing of copper and for other purposes. In the lower ratio-ranges the reaction of the air and fuel gas is generally endothermic; and in the higher ratio-ranges the reaction is generally exothermic. In the former, the resultant product-gas has a volume which is greater than the combined volumes of the supply gases and usually has insignificant amounts of water vapor and carbon dioxide. In the latter, the resultant product-gas has a volume which is less than the combined volumes of the supply gases, and usually has comparatively significant amounts of water vapor and carbon dioxide.

In practice it has been customary to design two different kinds of gas-generator systems, one for the reaction of the fuel gas and air in the higher ratio-ranges of about 5.5:1 and above; and the other for reaction of the gases in the lower ratio-ranges of about 4:1 and below. The gas-generators of the different systems have important distinguishing characteristics. In the designs adapted to handle the ratio-ranges of about 5.5:1 and above, of air to natural gas, the gas generator usually has had an open spacious gas-combustion chamber in which the air and fuel gas freely burn, and a catalyst-filled chamber into which the burnt gases pass for insuring completion of the reaction. The heat of the reaction is high and no external heating means is usually necessary. On the contrary, care must be taken to provide a sufficiently large gas-combustion chamber to insure substantially complete burning of the gases before they reach the catalyst. In the designs adapted to handle the ratio-ranges of about 4:1 and below, the gas generator has had a catalyst-filled chamber into which the supply-gases pass substantially directly, and it has had external heating means for heating the catalyst. Additionally, it is frequently desirable, for the low ratio-range generators, to provide an automatic means which will operate the generator in such a way that it does not become quickly clogged with a soot deposit. Neither the high ratio-range gas generator nor the low ratio-range gas generator operates in the intermediate range between 5.5:1 and 4:1.

A primary object of our invention is to provide a single practicable gas-generator system in which air and fuel gas can be thoroughly reacted through an exceptionally wide range of gas-ratios, the range extending substantially from the very richest of gas-mixtures (e. g. about 2.3:1 for air to natural gas) to substantially the very leanest of gas-mixtures (e. g. about 10:1 for air to natural gas).

A further object of our invention is to provide a gas-generator system of a type described, capable of reacting air and fuel gas in a full range of different ratios, including the endothermic and exothermal ranges; the gas generator of the system being so constructed that its tendencies for carbon deposits in the reaction chamber when the gas generator is operating in the rich gas-mixture range are reduced, and its tendencies for excessive temperatures when the supply gas is in the lean gas-mixture range are reduced.

Still another object of our invention is to provide a gas generator system which avoids the effect on the product-gas of the fluctuating humidity of the normal ambient air used for the gas mixture supplied to the gas generator.

Additional objects, features, combinations, subcombinations, innovations and methods attributable to our invention will be discernible from the following description of preferred forms thereof and the accompanying drawings. In the drawings, which, except for the gas generators, are not to scale:

Figure 1:
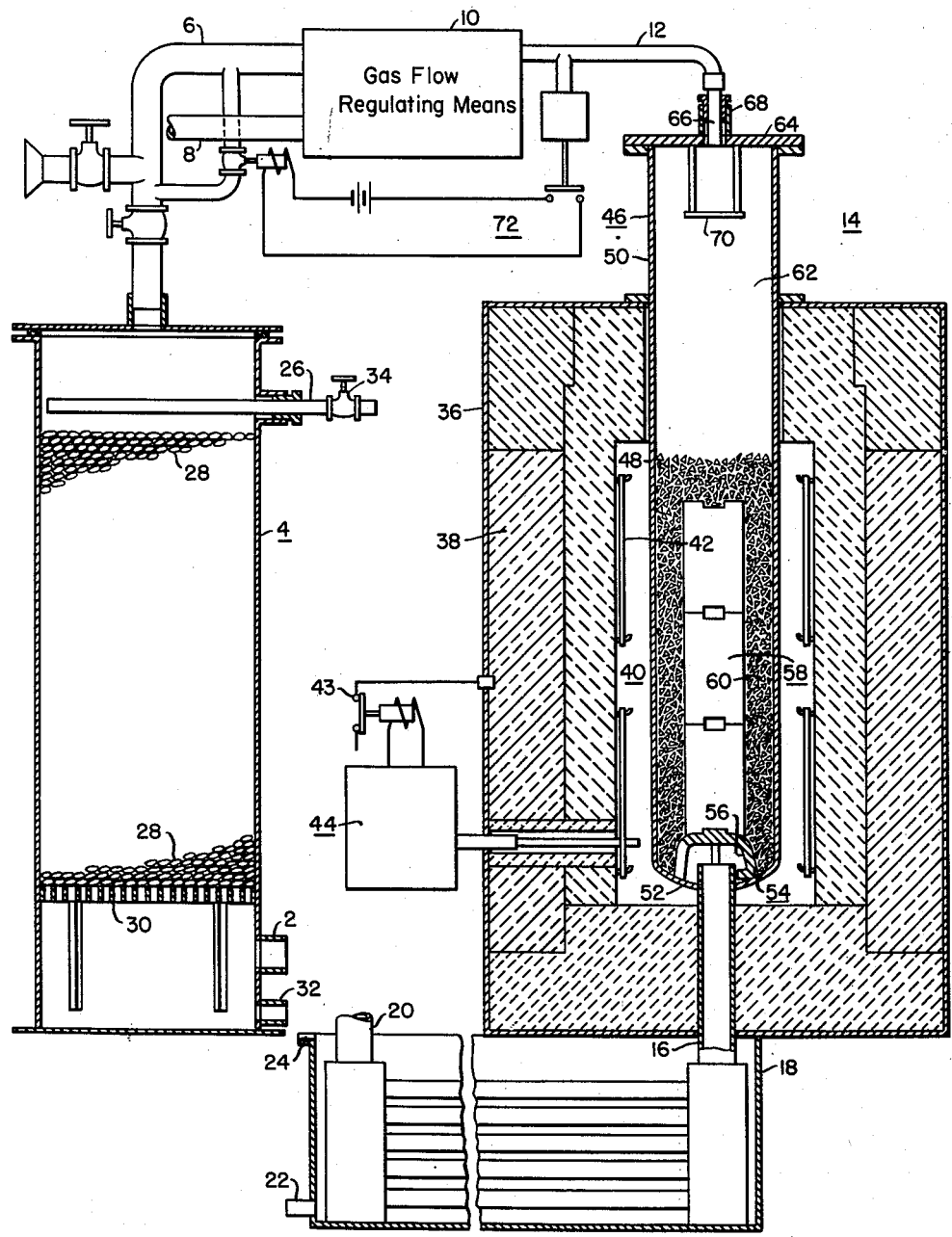
Figure 1 is a simplified view of a gas generator system embodying our invention, showing an electrically heated gas-generator in vertical section.

Referring to the gas generator system shown in Fig. 1, air passes from an intake pipe 2 through a humidifier 4 to an air supply pipe 6. Air from the air supply pipe 6 and fuel gas from a fuel gas supply pipe 8 are mixed in the desired proportions and pumped by any suitable gas-flow regulating means indicated in simplified entirety as a rectangle 10. From this gas-flow regulating means 10, the mixture of air and fuel gas flows into a feed pipe 12 that supplies the mixture to a gas-generator indicated in its entirety by the reference numeral 14. As the gas supply mixture passes through the generator 14 it reacts to provide a product-gas that leaves the gas generator through an outlet pipe 16 of the gas generator. This outlet pipe 16 is associated with a heat exchange equipment 18 that cools the product-gas, the cool product-gas leaving the equipment 18 through a pipe-line 20 which may be connected to any suitable utilization-equipment, either directly or after further processing of the gas.

The heat exhange equipment 18 has a water inlet 22 and a water outlet 24 through which a constant flow of cool water is provided for the equipment. Such cooling equipment discourages soot formation in the pipes for the product-gas immediately leaving the gas-generator.

The humidifier 4 may be of any suitable construction and is shown as having an upper sprinkler-inlet pipe 26 through which water is supplied and sprinkled over a water spreading means 28, which may be Raschig rings, carried on a supporting grid 30 positioned above the air intake pipe 2. Spent water leaves the humidifier through a drain 32. The sprinkler-inlet pipe 26 is provided with a shutoff valve 34.

The gas generator 14 comprises a round outer metal casing 36 which is lined with heat-insulating and refractory walls 38 arranged to define or bound a round interior heating chamber 40. In the embodiment shown in Fig. 1, the heating chamber 40 is heated by electrical resistors 42 having a main power supply line 43 under control of a thermostatic heat-regulating means 44. This thermostatic heat-regulating means may be of any suitable form for keeping the heating chamber 40 from falling below a temperature in the neighborhood of 1950° F. and also for shutting off the electrical resistors should the temperature of the heating chamber tend to rise much above this value.

The gas generator 14 includes a retort 46 in the general form of a circular metal tube. A part of the retort 46 lies within and is concentric with the heating chamber 40, and a part extends upwardly through the wall means 38 and outwardly beyond the outer casing 36. Although there is no clear line of division between these two retort-parts, for purposes of identification in connection with the description of the apparatus, the retort-portion that lies entirely within the heating chamber 40 is identified by the reference numeral 48, and the retort-portion above the casing 36 is identified by the reference numeral 50.

The lower retort-portion 48 has an integral curved bottom end-wall 52 that gas-tightly receives an end of the outlet pipe 16. The end-wall 52 carries a cast-alloy pier spacer 54 inside the retort 46. This pier spacer 54 is in the general form of a stool and has a plurality of spaced legs 56 between which product-gas passes on its way to the outlet pipe 16. A stack 58 of refractory-tile blocks is supported on the pier spacer 54, so as to be centrally disposed, inside the lower retort-portion 48. This stack 58 has a diameter smaller than that of retort-portion 48 so as to provide an annular space which is filled with a divided catalyst 60 adapted to promote the reaction of the gases therein. Activated alumina is a satisfactory catalyst 60 for a gas-mixture comprising natural gas. The stack 58 is slightly less in height than the heating chamber 40, and the amount of catalyst 60 in the retort portion 48 is limited so that the top of the catalyst bed is sufficiently below the top of the retort 46 to provide an adequate space for a relatively unheated and relatively unobstructed gas-combustion chamber 62 in the upper part of the retort that is above the lower retort-portion 48.

A removable metal top-plate 64 closes the top of the upper retort portion 50 of the retort 46. This top plate is fitted with a velocity-type burner pipe 66 which is connected to the feed supply pipe 12 for the supply gas-mixture. A suitable seal 68 is provided between the burner pipe 66 and the central hole in the plate 64 in which it is disposed; and a suitable gasket is provided between the plate 64 and the retort-flange to which it is bolted. If desired, a baffle plate 70 may be provided in the gas combustion chamber 62 at a slight distance from the discharge end of the burner pipe 66. This baffling plate 70 spreads the burning gas from the burner pipe 66 outwardly, so that the hot gases sweep the tubular wall defining the upper retort-portion 50. This retort-portion 50 is exposed to ambient temperature so that it is cooled by natural radiation and other cooling effects, but it can be artificially cooled if desired. However, the baffle pipe 70 can be omitted since the turbulence and heat of the burning gas mixture in the gas combustion chamber 62 will heat the retort-portion 50.

Figure 4:
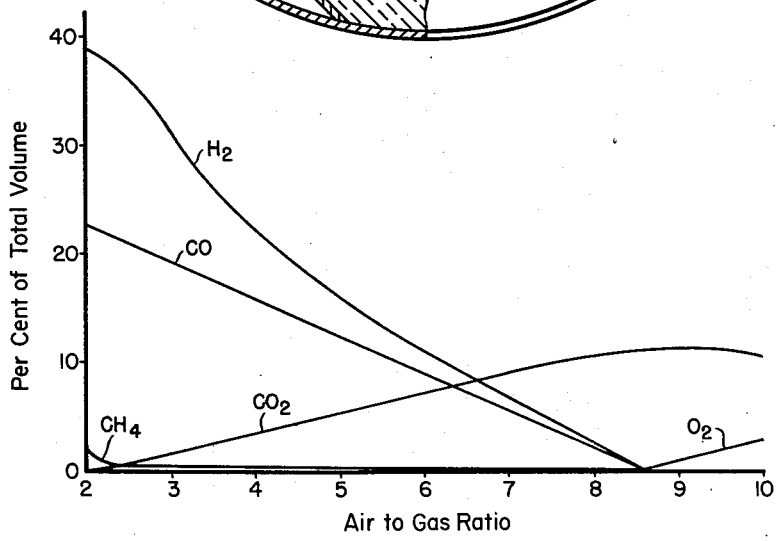
Fig. 4 is a graphic representation indicating the performance of a gas generator system such as shown in Fig. 1, the ordinates indicating a measure of the volume-percentages of the various components of the product-gas resulting from a reacting mixture of air and natural gas in volume-ratios indicated as abscissa.

With a gas generator such as described, it is practicable to react a fuel gas and air in ratios through a full range including endothermal and exothermal conditions. Fig. 4 represents the composition of product-gas obtained from the gas-generator of Fig. 1, having a retort with an overall length of 47¾ inches, the gas generator being supplied with air and natural gas in the ratios indicated, and having a rated output of 500 cubic feet per hour of product-gas. Somewhat lower and higher ratios than those shown can also be reacted in a gas-generator. It is, of course, known that similar curves can be obtained for the reaction of air with any fuel gas.

If the gas generator 14 is operated with a lean mixture in the high exothermic range, the velocity type burner 66 will prevent back-fire and the air-cooled retort-portion 50 keeps the temperature from becoming excessive; the combustion or reaction of the gases will take place mostly in the gas-combustion chamber 62, and will be thoroughly completed in the catalyst bed which the products of reaction keep hot; and the heating resistors 42 will be cut off by the thermostatic heat-regulating means 44 at the set control temperature, which will be as high as possible consistent with a practical life for the heating resistors 42. In the medium lean range of about 5:1, to 7.5:1 the action is quite similar, except that more of the reaction takes place in the catalyst bed 60; and occasionally external heat is necessary in order to keep the catalyst bed hot, because of the loss of heat in the upper retort-portion 50.

During operation with rich mixtures, little, if any, combustion or reaction will occur in the spacious gas combustion chamber 62, and the main reaction will take place in the catalyst bed 60 which is kept hot by the electrical resistors 42.

The use of an alloy retort 50 in the gas generator limits its operating temperatures. For high grade refractory nickel-chromium alloys the control temperatures may be set to values of about 1850° F. to 1950° F. Because the temperature to which a metal alloy retort can be heated is limited, it is highly desirable, in an all purpose generator system such as shown in Fig. 1, to provide an automatic means that will operate whenever the soot deposit in the catalyst bed 60 becomes obnoxious. A suitable form comprises a pressure responsive control 72 of a type described in our application Serial No. 447,682, filed June 19, 1942, Patent No. 2,546,013, dated March 20, 1951.

An important advantage of the system described in Fig. 1 resides in the fact that the gas generator 14 has both an external heating means 42 and a spacious gas combustion chamber 62, so that it can be operated to yield product-gas at volume-rates considerably less than the rated volume. The external heating means 44 supplies heat when the temperature of the heating chamber 40 falls below the control temperature sensed by the thermostatic responsive means 44, regardless of the ratio-range of the supply gases.

In the high ratio-range the reacting gas will keep the catalyst bed above the control temperature only if the total volume of burning gases is adequate. Should the gas generator be called upon to deliver less of the same product-gas, the volume of the gases supplied to the gas generator is correspondingly decreased, and the total heat available may not be enough to keep the catalyst bed above the control temperature without the aid of the external heating means 42. Consequently, the heating means goes into operation for maintaining the catalyst bed at a high temperature even with lean mixtures, so that the gas generator will produce satisfactory product-gas at an output rate which is much less than its rated capacity.

Operating the catalyst bed considerably above the 1950° F. causes less trouble from soot deposits. The electrically heated gas generator of Fig. 1 has the disadvantage of limited operating temperatures imposed by the use of a metal retort 50 and metal heating elements 42. The gas generator of Fig. 2 uses more non-metallic refractories and can be operated at higher temperatures. Consequently, the automatic carbon-deposit control means 72 can be omitted.

Figure 2:
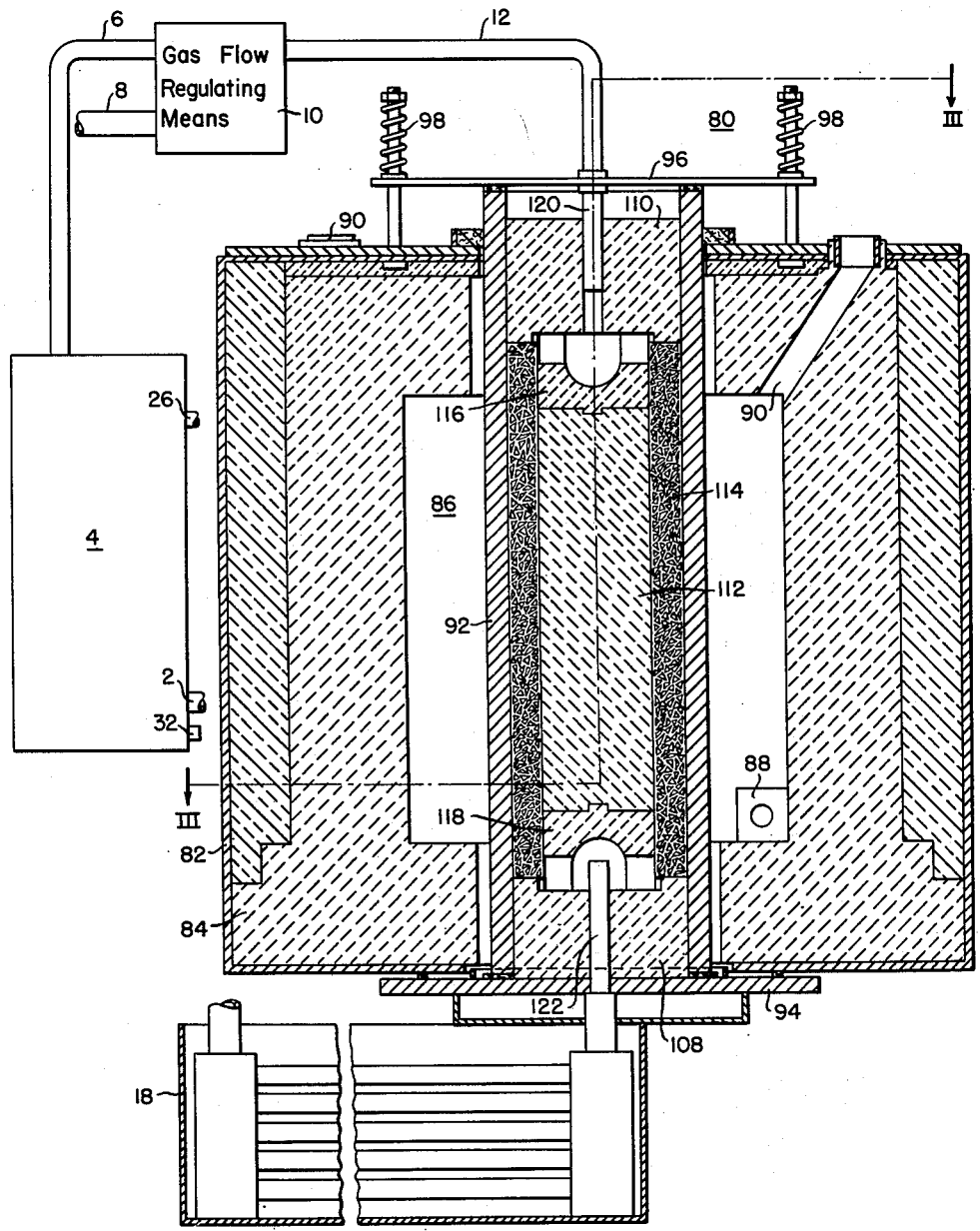
Fig. 2 is a simplified view of another embodiment of our invention.
Figure 3:
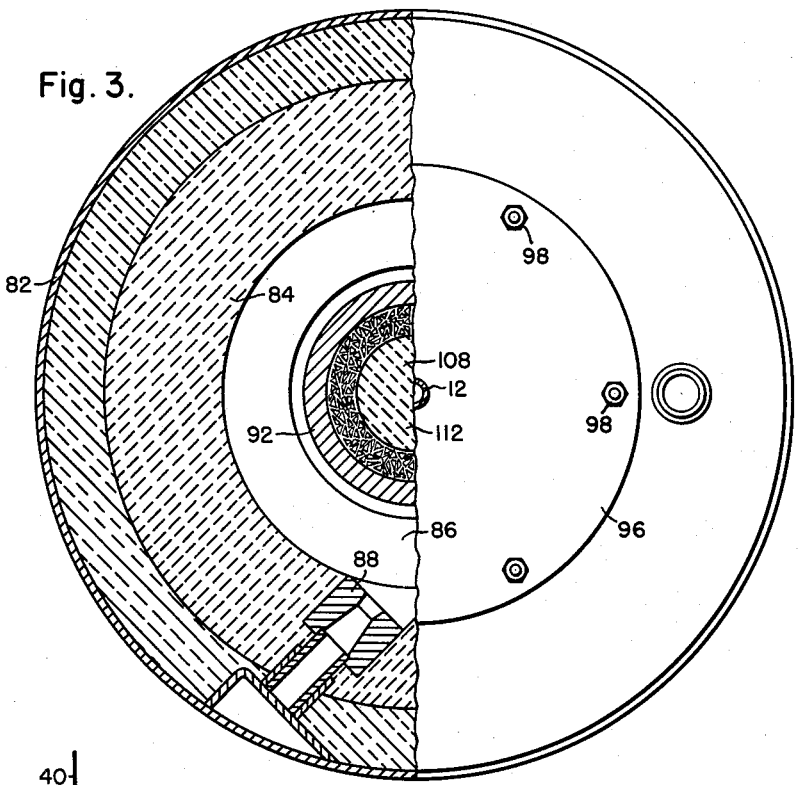
Fig. 3 is a sectional view substantially on the line III—III of Fig. 2.

As shown in Figs. 2 and 3, the gas generator, which is indicated in its entirety by the reference numeral 80, comprises a round outer casing 82 and lining walls 84 defining a round heating chamber 86 which is heated by gas burners 88 firing tangentially. A plurality of chimneys 90 permit the burning gases to leave the gas generator. The gas generator supports a central tubular retort 92 of silicon carbide. An end of the retort rests on a base plate 94 secured to the casing 82 by suitable bolt means. An asbestos rope and red lead gasket or any other suitable gasket can be provided for insuring a tight joint. The upper end of the retort 92 is closed by a metal plate 96 with a suitable gasket interposed. The plate 96 is spring pressed downwardly against the top edge of the retort by any suitable means indicated at 98 which also allows the retort to expand and contract.

The ends of the retort 92 are closed by a lower tile 108 and an upper tile 110. The lower tile 108 carries an axially disposed stack 112 which is surrounded by an annular retort-space that is filled with a divided catalyst 114. The top and bottom of the stack 112 comprise pier spacers 116 and 118 shaped in the manner of the pier spacer 54 of Fig. 1 and provided with spaced legs between which gases pass. A velocity type burner pipe 120 is secured to the plate 96 and is disposed centrally in the upper tile 110. A gas-mixture is fed to the burner 120 through a pipe-line 12 corresponding to that of Fig. 1. The supply gases leaving the burner 120 pass between the legs of the spacer 116 to the catalyst bed 114; and product-gas leaving the catalyst bed 114 passes between the legs of the lower spacer 118 to an output pipe 122 connected to a heat exchanger 18.

The heating chamber 86 is kept at any suitable minimum control temperature by any suitable means operating on the burners 88. Because of the use of gas burners for heating the chamber 88 and the use of a non-metallic refractory for the retort 92 the control temperature can be much higher than that for the heating chamber of Fig. 1. Temperatures as high as 2200° F.–2400° F. can be utilized regardless of whether the reaction is endothermic or exothermic. It is, of course, obvious that the length and frequency of the periods during which the burners 88 operate will depend on the richness or leanness of the gas mixture being supplied to the gas generator.

While we have described our invention in forms which we now prefer, it is obvious that the principles of our invention are subject to wide variations.

We claim as our invention:

1. A single broad-range gas-generating apparatus in which air and fuel gas can be catalytically reacted in ratios ranging from rich gas-mixtures having endothermically reacting low ratios of air to fuel gas, to lean gas-mixtures having exothermically reacting high ratios of air to fuel gas, to produce a widely variable controlled special gaseous product, said apparatus comprising, in combination, a thermally insulating outer casing and wall means defining a heating chamber, a separately regulatable heating means for said chamber, a retort having inlet and outlet means, a gas-outlet pipe-line from said outlet means of the retort, a velocity-type burner-pipe leading into said inlet means of the retort, a pipe line for supplying the above-described broadly variable mixture of air and fuel gas to said burner-pipe, and regulating means for controlling the ratio of air to fuel gas; said retort having a reaction-portion including said outlet means and disposed within said heating chamber in good heat-exchange relation thereto, and being adapted to contain a catalyst within said reaction-portion of the retort for promoting the reaction of fuel gas and air; and said retort having a combustion-chamber portion disposed in poor heat-exchange relation to said heating chamber and providing a relatively unheated and relatively unobstructed combustion-chamber between said inlet means and said reaction-portion of said retort.

2. The invention as defined in claim 1, characterized by said retort being an upstanding retort having substantially tubular side-walls, the top portion of said side-walls extending above the outer casing of the heating chamber, and the inlet means of the retort being at the top of said retort.

CLARENCE E. PECK.
JOHN G. HOOP.

REFERENCES CITED

The following references are of record in the file of this patent:

UNITED STATES PATENTS

| Number | Name | Date |
|---|---|---|
| 2,085,586 | Hotchkiss | June 29, 1937 |
| 2,221,583 | Hoop | Nov. 12, 1940 |
| 2,296,434 | Ghelardi | Sept. 22, 1942 |
| 2,314,827 | Hortvet | Mar. 23, 1943 |
| 2,381,306 | Peck | Aug. 7, 1945 |